(12) United States Patent
Asai et al.

(10) Patent No.: US 8,440,306 B2
(45) Date of Patent: May 14, 2013

(54) CONDUCTIVE FILM

(75) Inventors: Masato Asai, Anpachi-gun (JP); Ai Koganemaru, Anpachi-gun (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 534 days.

(21) Appl. No.: 12/439,958

(22) PCT Filed: Sep. 3, 2007

(86) PCT No.: PCT/JP2007/067547
§ 371 (c)(1),
(2), (4) Date: Mar. 4, 2009

(87) PCT Pub. No.: WO2008/029933
PCT Pub. Date: Mar. 13, 2008

(65) Prior Publication Data
US 2011/0001720 A1 Jan. 6, 2011

(30) Foreign Application Priority Data
Sep. 5, 2006 (JP) ................. 2006-240021

(51) Int. Cl.
*B32B 27/36* (2006.01)
*C08G 75/00* (2006.01)

(52) U.S. Cl.
USPC ........... 428/414; 428/480; 428/482; 428/483; 428/704; 345/173; 528/377; 528/380

(58) Field of Classification Search ............. 345/173; 428/414, 480, 482, 483, 704; 528/377, 380
See application file for complete search history.

(56) References Cited

U.S. PATENT DOCUMENTS
6,254,996 B1 * 7/2001 Fukuda et al. ............... 428/480
2005/0219230 A1 10/2005 Nakayama et al.
(Continued)

FOREIGN PATENT DOCUMENTS
CN 1680907 A 10/2005
EP 0669359 A1 8/1995
(Continued)

OTHER PUBLICATIONS
Database WPI Week 200578, Thomson Scientific, London, GB; AN 2005-761887, XP-002543917.
(Continued)

*Primary Examiner* — Richard A Huhn
(74) *Attorney, Agent, or Firm* — Sughrue Mion, PLLC

(57) ABSTRACT

A conductive film which is excellent in moist heat resistance, conductivity, transparency and coating film strength.
The conductive film comprises a base film and a coating layer formed on the base film by curing a composition comprising:
(i) a conducting polymer containing a polycationic polythiophene having a recurring unit represented by the following formula (1) as the main constituent and a polyanion (component A):

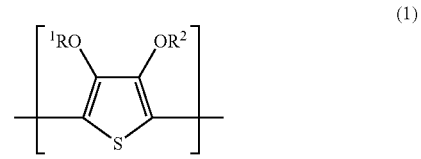

(1)

wherein $R^1$ and $R^2$ are each independently a hydrogen atom or alkyl group having 1 to 4 carbon atoms or bonded together to form an alkylene group having 1 to 12 carbon atoms which may be substituted arbitrarily;
(ii) a water-soluble compound having at least one hydrophilic group selected from the group consisting of oxyethylene group and sulfonate group (component B); and
(iii) a crosslinking agent having a glycidyl group (component C), and
which has a surface resistance change rate after it is treated at a temperature of 60° C. and a humidity of 90% for 240 hours of 160% or less.

6 Claims, 1 Drawing Sheet

U.S. PATENT DOCUMENTS

| | | |
|---|---|---|
| 2006/0062958 A1 | 3/2006 | Yoshida et al. |
| 2006/0076541 A1 | 4/2006 | Yoshida et al. |
| 2007/0182457 A1 * | 8/2007 | Yasuda .......................... 327/1 |
| 2009/0120775 A1 | 5/2009 | Morita et al. |

FOREIGN PATENT DOCUMENTS

| | | |
|---|---|---|
| EP | 1 142 727 A1 | 10/2001 |
| EP | 1847386 A1 | 10/2007 |
| JP | 63-17023 A | 1/1988 |
| JP | 63037937 A * | 2/1988 |
| JP | 1-313521 A | 12/1989 |
| JP | 11198327 A * | 7/1999 |
| JP | 2000-186218 A | 7/2000 |
| JP | 2002193972 A | 7/2002 |
| JP | 2003286336 A | 10/2003 |
| JP | 2005281704 A * | 10/2005 |
| JP | 2006-028439 A | 2/2006 |
| JP | 2006028439 A | 2/2006 |
| JP | 2006-302561 A | 11/2006 |
| JP | 2006-302562 A | 11/2006 |
| JP | 2006302561 A | 11/2006 |
| JP | 2006302562 A | 11/2006 |
| WO | 01/30584 A1 | 5/2001 |
| WO | 2004/018560 A1 | 3/2004 |
| WO | 2006/041032 A1 | 4/2006 |
| WO | 2006041032 A1 | 4/2006 |
| WO | 2006/082944 A1 | 8/2006 |
| WO | 2006082944 A1 | 8/2006 |
| WO | WO 2007/058119 A1 | 5/2007 |

OTHER PUBLICATIONS

Japanese Office Action for Patent Applicaiton No. 2007-72465 dispatched Aug. 21, 2012.

* cited by examiner

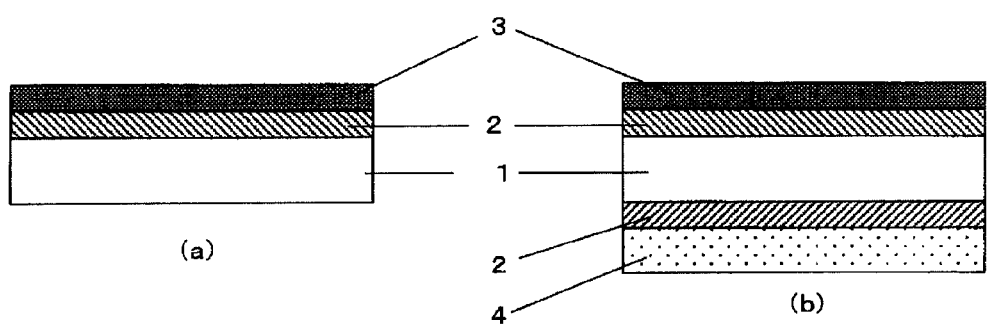

CONDUCTIVE FILM

TECHNICAL FIELD

The present invention relates to a conductive film. More specifically, it relates to a transparent conductive film which is excellent in transparency and conductivity as well as moist heat resistance.

BACKGROUND OF THE ART

A transparent conductive film is used as a transparent electrode for liquid crystal displays or transparent touch panels or as an electromagnetic shielding material.

There are known transparent conductive films having indium oxide ($In_2O_3$), tin oxide ($SnO_2$) or a mixed sintered material (ITO) of $In_2O_3$ and $SnO_2$ which is formed on the surface of a transparent film made of polyethylene terephthalate (PET) or triacetyl cellulose (TAC) by a dry process such as vacuum deposition, sputtering or ion plating.

There are also known transparent conductive films obtained by a wet process in which a coating layer is formed by applying a conducting polymer to the surface of a transparent film. Polythiophene, polyaniline and polypyrrole are known as the conducting polymer used in the wet process.

Since the transparent conductive films are continuously processed in a web form, punched or surface processed and kept while they are bent, the transparent conductive films obtained by the dry process may crack while they are processed or kept, thereby increasing their surface resistances.

Meanwhile, the transparent conductive films formed by the wet process hardly crack because their coating layers have flexibility. Further, the wet process has such advantages that its production cost is lower than that of the dry process and it has high productivity as its coating speed is generally fast. However, the transparent conductive films formed by the wet process are not satisfactory in terms of conductivity and color.

Various improvements have recently been proposed for the transparent conductive films formed by the wet process. For example, a conducting polymer (Patent Document 1) comprising poly(3,4-dialkoxythiophene) and polyanion obtained by oxidation polymerizing 3,4-dialkoxythiophene in the presence of the polyanion has extremely low surface resistance while it retains a high light transmittance due to the improvement of its production process (Patent Document 2 and Patent Document 3).

However, a conductive film having a coating layer of the conducting polymer is inferior in moist heat resistance and is not suitable for use in liquid crystal displays (LCD) and transparent touch panels. Therefore, a method in which various binders are used to improve the water resistance of the conducting polymer has been proposed (Patent Document 4).
(Patent Document 1) JP-A 1-313521
(Patent Document 2) JP-A 2002-193972
(Patent Document 3) JP-A 2003-286336
(Patent Document 4) JP-A 2005-281704

DISCLOSURE OF THE INVENTION

It is an object of the present invention to provide a conductive film having excellent moist heat resistance which can operate stably for a long time even when it is used as a display electrode or a touch panel electrode. It is still another object of the present invention to provide a conductive film which is excellent in conductivity, transparency and the strength of a coating film.

When a water-soluble compound is contained in the coating layer of a conductive film containing a polythiophene in the coating layer, conductivity is improved. However, when the water-soluble compound is contained, the moist heat resistance of the conductive film degrades. The inventors of the present invention have studied a method of obtaining both conductivity and moist heat resistance of the film. As a result, they have found that when a crosslinking agent is contained in the coating layer in addition to a polythiophene and a water-soluble compound, moist heat resistance can be improved while conductivity is maintained. The present invention has been accomplished based on this finding.

That is, the present invention is a conductive film which comprises a base film and a coating layer formed on at least one side of the base film by curing a composition comprising:
(i) a conducting polymer containing a polycationic polythiophene having a recurring unit represented by the following formula (1) as the main constituent and a polyanion (component A):

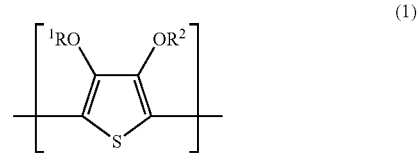

wherein $R^1$ and $R^2$ are each independently a hydrogen atom or alkyl group having 1 to 4 carbon atoms or bonded together to form an alkylene group having 1 to 12 carbon atoms which may be substituted arbitrarily;
(ii) 10 to 1,000 parts by mass of a water-soluble compound having at least one hydrophilic group selected from the group consisting of oxyethylene group and sulfonate group based on 100 parts by mass of component A (component B); and
(iii) 10 to 1,000 parts by mass of a crosslinking agent having a glycidyl group based on 100 parts by mass of component A (component C), and
which has a surface resistance change rate after it is treated at a temperature of 60° C. and a humidity of 90% for 240 hours of 160% or less.

The present invention includes a resistive touch panel comprising a pair of electrodes, each having a conductive layer, in such a manner that the conductive layers are opposed to each other with a spacer therebetween, wherein the above conductive film is used as at least one of the electrodes.

BRIEF DESCRIPTION OF THE DRAWINGS

FIG. 1 is a sectional view of one example of the conductive film of the present invention.

EXPLANATIONS OF LETTERS OR NOTATIONS 1. base film
2. anchor coat layer
3. coating layer
4. hard coat layer

BEST MODE FOR CARRYING OUT THE INVENTION

The conductive film of the present invention will be first described with reference to the accompanying drawings. FIG. 1 is a sectional view of the conductive film of the present invention, that is, one example of the layer constitution. In FIG. 1, reference numeral 1 denotes a base film, 2 an anchor coat layer which is optionally provided, 3 a coating layer, and 4 a hard coat layer which is optionally provided. As understood from FIG. 1, the conductive film of the present invention has the coating layer formed on the anchor coat layer which is optionally formed on at least one side of the base film. When the conductive film has the above constitution, another functional layer such as a hard coat layer may be formed as long as the object of the present invention is not impaired, and FIG. 1(b) shows that an anchor coat layer and a hard coat layer are formed on a side opposite to the coating layer formed side. The conductive film of the present invention has a coating layer formed from a composition which will be described hereinafter on at least one side of the base film. The conductive film of the present invention will be described in more detail hereinunder.

The conductive film of the present invention has a coating layer on at least one side of the base film. The coating layer in the present invention is a layer obtained by curing a composition which comprises a conducting polymer (component A), a water-soluble compound (component B) and a crosslinking agent (component C).

(Conducting Polymer: Component A)

The conducting polymer (component A) contains a polycationic polythiophene (poly-3,4-di-substituted thiophene) having a unit represented by the following formula (1) as the main constituent and a polyanion. That is, the conducting polymer (component A) is a composite compound of a polythiophene and a polyanion. The conducting polymer (component A) is used as a water dispersion.

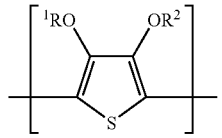

(1)

In the above formula, $R^1$ and $R^2$ are each independently a hydrogen atom or alkyl group having 1 to 4 carbon atoms. Examples of the alkyl group having 1 to 4 carbon atoms are methyl group, ethyl group, propyl group and butyl group.

Alternatively, $R^1$ and $R^2$ are bonded together to form an alkylene group having 1 to 12 carbon atoms which may be substituted arbitrarily. Examples of the alkylene group having 1 to 12 carbon atoms include methylene group, 1,2-ethylene group, 1,2-propylene group, 1,3-propylene group, 2,3-butylene group, 2,3-pentylene group and 1,2-cyclohexylene group. A methylene group and 1,2-alkylene groups such as 1,2-ethylene group and 1,2-cyclohexylene group are particularly preferred. The 1,2-alkylene groups can be derived from 1,2-dibromoalkanes obtained by brominating α-olefins such as ethene, propene, hexene, octene, decene, dodecene and styrene. Examples of the substituent include an alkyl group having 1 to 12 carbon atoms or phenyl group. Examples of the alkyl group having 1 to 12 carbon atoms as the substituent include methyl group, ethyl group and propyl group.

The expression "as the main constituent" means that the content of the unit represented by the formula (1) is preferably 50 to 100 mol %, more preferably 80 to 100 mol %, much more preferably 90 to 100 mol based on the total of all the recurring units constituting the polythiophene. Other recurring units are those having no substituent (s) $OR^1$ and/or $OR^2$ in the formula (1).

The polythiophene having the recurring unit represented by the formula (1) is cationic. This cationic polythiophene can be obtained by the oxidation polymerization of 3,4-di-substituted thiophene which is a monomer by the method disclosed by JP-A 01-313521.

Examples of the polyanion include polycarboxylic acids and polysulfonic acids. The polycarboxylic acids include polyacrylic acid, polymethacrylic acid and polymaleic acid. The polysulfonic acids include polystyrene sulfonic acid and polyvinyl sulfonic acid.

The polyanion such as a polycarboxylic acid or a polysulfonic acid may be a homopolymer obtained by polymerizing only one anionic monomer such as vinylcarboxylic acid or vinylsulfonic acid. It may be a copolymer of two or more anionic monomers. Further, it may be a copolymer of an anionic monomer and another monomer copolymerizable with the monomer. Examples of the another monomer copolymerizable with an anionic monomer include acrylates and styrene.

When the polyanion is a copolymer, at least one anionic monomer must be used as a comonomer and a plurality of anionic monomers or a plurality of other comonomers may be optionally used.

The polyanion is particularly preferably polystyrene sulfonic acid or polystyrene sulfonic acid at least part of which is a metal salt. The number average molecular weight of the polyanion is preferably 1,000 to 2,000,000, more preferably 2,000 to 500,000.

The content of the anionic monomer constituting the polyanion in the conducting polymer (component A) is preferably 0.1 to 20 mol %, more preferably 0.25 to 10 mol %, particularly preferably 0.5 to 5 mol based on 1 mol of the recurring unit represented by the formula (1) of the poly-3,4-di-substituted thiophene.

(Water-soluble Compound: Component B)

The water-soluble compound (component B) has at least one hydrophilic group selected from the group consisting of oxyethylene group and sulfonate group. The content of the water-soluble compound (component B) is 10 to 1,000 parts by mass, preferably 20 to 500 parts by mass based on 100 parts by mass of the conducting polymer (component A).

(Component B-1)

A water-soluble compound (component B-1) which contains at least 3 photocurable functional groups and 10 to 30 oxyethylene groups (—O—$CH_2$—$CH_2$—) in the molecule is preferred as the water-soluble compound (component B).

Examples of the photocurable functional group include acryl group, methacryl group, epoxy group and oxetane group, out of which acryl group and methacryl group (may be collectively referred to as "(meth) acryl group" hereinafter) are preferred. When the number of photocurable functional groups in the component B-1 is 2 or less, crosslinking density after curing becomes unsatisfactory, whereby the effect of improving moist heat resistance becomes unsatisfactory. Although the upper limit of the number of photocurable functional groups does not need to be particularly limited, it is generally 6 or less from the viewpoint of acquisition ease and cost.

A photopolymerization initiator is preferably contained for the crosslinking reaction/curing of the photocurable functional groups. Examples of the photopolymerization initiator include 1-hydroxycyclohexylphenyl ketone, 2,2-dimethoxy-2-phenylacetophenone, xanthone, fluorenone, anthraquinone, benzaldehyde, fluorene, anthraquinone, triphenylamine, carbazole, 3-methylaectophenone, 4-chlorobenzophenone, 2,2-dimethoxy-2-phenylacetophenone, 2-methyl-1-1[4-(methylthio)phenyl]-2-morpholino-propan- 1-one, 2,4,6-trimethylbenzoyldiphenylphosphine oxide and bis(2,6-dimethoxybenzoyl)2,4,4-trimethylpentylphosphine oxide. The content of the photopolymerization initiator is preferably 10 parts or less by mass based on 100 parts by mass of the water-soluble compound (B-1). When the content is higher than 10 parts by mass based on 100 parts by mass of the component B-1, the photopolymerization initiator may serve as a plasticizer to reduce the strength of the coating layer.

The total number of oxyethylene groups is preferably 10 to 30, more preferably 15 to 25. The oxyethylene groups may be all existent at one location in the molecule but preferably at 2 to 4 locations. When the total number of oxyethylene groups in the component B-1 is less than 10, water solubility becomes unsatisfactory, thereby deteriorating the stability of the obtained composition. When the total number is more than 30, the molecular weight of the component B-1 becomes too high, thereby reducing crosslinking density. As a result, the effect of improving moist heat resistance becomes unsatisfactory. Examples of the component B-1 include compounds represented by the following formulas (2) to (4).

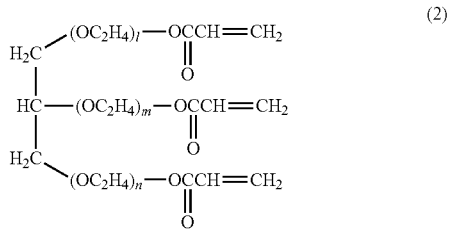

(2)

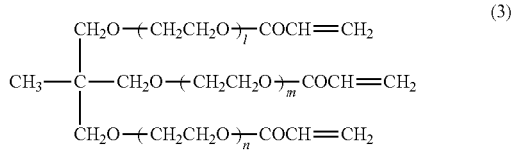

(3)

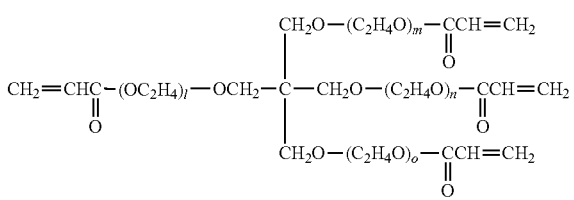

(4)

In the formulas (2) to (4), l, m, n and o are each an integer of 0 or more. In the compound represented by the formula (2), l+m+n is preferably 10 to 30, more preferably 15 to 25. In the compound represented by the formula (3), l+m+n is preferably 10 to 30, more preferably 15 to 25. In the compound represented by the formula (4), l+m+n+o is preferably 10 to 30, more preferably 15 to 25.

The content of the component B-1 is 10 to 1,000 parts by mass, preferably 20 to 500 parts by mass based on 100 parts by mass of the conducting polymer (component A).

(Component B-2)

A water-soluble polyester (component B-2) having a sulfonate group and a hydroxyl group or carboxyl group is preferred as the water-soluble compound (component B).

The component B-2 is a polyester composed of a dicarboxylic acid component and a diol component. Examples of the dicarboxylic acid component include terephthalic acid, isophthalic acid, phthalic acid and sulfoisophthalic acid metal salts. Examples of the diol component include ethylene glycol, diethylene glycol, propylene glycol, 1,4-butanediol, 1,6-hexanediol, neopentyl glycol and cyclohexane dimethanol. The component B-2 is produced by polycondensing a dicarboxylic acid and a diol.

The weight average molecular weight of the water-soluble polyester (component B-2) is preferably 1,000 to 100,000, more preferably 10,000 to 50,000.

The component B-2 contains a sulfonate group. The sulfonate group is, for example, an alkali metal sulfonate group represented by $-SO_3Na$ or $-SO_3K$. The content of the sulfonate group in the component B-2 is preferably 2 to 10 mol %, more preferably 5 to 8 mol % based on 100 mol % of the total of all the acid components of the component B-2. The component B-2 preferably contains 65 to 85 mol % of terephthalic acid, 10 to 27 mol % of isophthalic acid and 5 to 8 mol % of an alkali metal salt of 5-sulfoisophthalic acid as dicarboxylic acid components.

The component B-2 contains a hydroxyl group, carboxyl group or both of them. The total content of the hydroxyl group and the carboxyl group is preferably 0.1 to 40 mol %, more preferably 1 to 20 mol based on 100 mol % of the total of all the acid components of the component B-2. The hydroxyl group or the carboxyl group may be existent at both of the terminal and the side chain or at either the terminal or the side chain and the numbers of the hydroxyl groups and the carboxyl groups are not limited. The term "water-soluble" in the present invention means that the substance is soluble in methanol containing 50% or more (vol %) of water.

A commercially available product may be used as the component B-2 directly. Examples of the commercially available water-soluble polyester include the Plus Coat RZ-570, RZ-142, Z-565, Z-561 and Z-685 of Goo Chemical Co., Ltd.

The content of the component B-2 in the composition is preferably 25 to 55 parts by mass, more preferably 30 to 55 parts by mass, much more preferably 35 to 55 parts by mass based on 100 parts by mass of the conducting polymer (component A). When the content of the component B-2 is lower than 25 parts by mass based on 100 parts by mass of the component A, moist heat resistance becomes unsatisfactory. When the content is higher than 55 parts by mass, conductivity lowers. The expression "based on 100 parts by mass of the conducting polymer" means based on 100 parts by mass of the solid content of the conducting polymer.

(Crosslinking Agent: Component C)

The crosslinking agent (component C) has a glycidyl group. The content of the component C is 10 to 1,000 parts by mass based on 100 parts by mass of the conducting polymer (component A).

(Component C-1)

The crosslinking agent (component C) is preferably an alkoxysilane having a glycidyl group (component C-1). The component C-1 is preferably a trialkoxysilane having a glycidoxy group. An example of the trialkoxysilane is γ-glycidoxypropyltrimethoxysilane.

A catalyst is preferably used to promote the hydrolysis/condensation of the alkoxysilane efficiently. The catalyst may be either one of an acidic catalyst and a basic catalyst. Preferred examples of the acidic catalyst include inorganic acids such as acetic acid, hydrochloric acid and nitric acid, and organic acids such as acetic acid, citric acid, propionic acid, oxalic acid and p-toluenesulfonic acid. Preferred examples of the basic catalyst include organic amine compounds such as ammonia, triethylamine and tripropylamine, and alkali metal compounds such as sodium methoxide, potassium methoxide, potassium ethoxide, sodium hydroxide and potassium hydroxide.

The content of the component C-1 is 10 to 1,000 parts by mass, preferably 20 to 300 parts by mass, more preferably 30 to 200 parts by mass based on 100 parts by mass of the conducting polymer (component A). When the content of the component C-1 is lower than 10 parts by mass, the strength, moist heat resistance and solvent resistance of the obtained coating layer deteriorate and when the content is higher than 1,000 parts by mass, the conductivity of the obtained coating layer degrades disadvantageously.

The moist heat resistance and strength of the obtained coating layer can be improved by using the component C-1. The alkoxysilane compound is hydrolyzed and existent in the coating layer in the form of a reaction product formed by a condensation reaction.

(Component C-2)

The crosslinking agent (component C) is preferably an acryl modified polyester having a glycidyl group (component C-2). When the component C-2 contains a glycidyl group, it is self-crosslinkable and reacts with the hydroxyl group or carboxyl group of the water-soluble polyester (component B-2) to fulfill the function of a crosslinking agent. A coating layer having high moist heat resistance can be obtained by using the component C-2. The component C-2 is stable even in an acidic coating solution and can keep a long pot life of the coating solution.

The position of the glycidyl group in the component C-2 is not particularly limited and may be at both of the terminal and the side chain or at either the terminal or the side chain. The content of the glycidyl group is preferably 3 to 20 mol %, more preferably 5 to 15 mol % based on 100 mol % of the acryl component of the component C-2.

The component C-2 can be produced by the methods disclosed by JP-A 63-37937 and JP-A 11-198327. That is, it can be produced by graft polymerizing an acrylic copolymer as a branch polymer with a polyester copolymer as a trunk polymer. For the graft polymerization, there are (A) a method in which a reaction start point such as a radical, cation or anion is formed in the trunk polymer and an acrylic monomer is graft polymerized, (B) a method in which an acrylic monomer is graft polymerized by using a chain transfer reaction to the trunk polymer in the presence of the trunk polymer or (C) a method in which a trunk polymer having a functional group in the side chain and a branch polymer having a group which reacts with the above functional group at a terminal are reacted with each other.

The acryl modified polyester is a graft copolymer obtained by polymerizing an acrylic monomer in the presence of a polyester or a graft copolymer obtained by reacting a polyester with an acrylic polymer to a high polymerization degree. The polyester is a linear polyester composed of a polycarboxylic acid component and a polyol component as constituent components. Preferred examples of the polycarboxylic acid component include terephthalic acid, isophthalic acid, sulfoisophthalic acid metal salts, naphthalenedicarboxylic acid, 4,4'-diphenyldicarboxylic acid, adipic acid, sebacic acid, dodecanedicarboxylic acid and hexahydroterephthalic acid.

Preferred examples of the polyol component include ethylene glycol, diethylene glycol, propylene glycol, 1,3-propanediol, 1,4-butanediol, neopentyl glycol, 1,5-pentanediol, 1,6-hexanediol, dipropylene glycol, triethylene glycol, bisphenol A-alkylene oxide adduct, hydrogenated bisphenol A-alkylene oxide adduct, 1,4-cyclohexane dimethanol, polyethylene glycol and polytetramethylene glycol.

A component having a sulfonate group may be copolymerized with this polyester to provide hydrophilic nature. When hydrophilic nature is provided to this polyester resin, the dispersibility into an aqueous coating solution of the polyester resin becomes high. Examples of the component include 5-Na sulfoisophthalic acid and 5-K sulfoisophthalic acid.

The polyester may be obtained by copolymerizing a small amount (for example, 5 mol % or less) of a polyvalent compound having a functionality of 3 or more as long as it becomes substantially a linear polymer. Examples of the polyvalent compound having a functionality of 3 or more include trimellitic acid, pyromellitic acid, dimethylol propionic acid, glycerin and trimethylolpropane.

Examples of the acrylic monomer used to form the graft copolymer include ethyl acrylate, methyl acrylate, acrylic acid, butyl acrylate, sodium acrylate, ammonium acrylate, ethyl methacrylate, methyl methacrylate, methacrylic acid, butyl methacrylate, glycidyl methacrylate, 2-hydroxyethyl acrylate, acrylamide, methacrylamide, N-methoxymethyl acrylamide and N-methylol acrylamide. The acrylic polymer may be a polymer or copolymer obtained from the acrylic monomers. A commercially available product may be used as the component C-2 directly. Commercially available acrylic modified polyesters include the Pesresin A-615GE, A-613GX and A-614GL of Takamatsu Oil & Fat Co., Ltd.

The number average molecular weight of the polyester component in the component C-2 is preferably 500 to 50,000, more preferably 1,000 to 30,000. The number average molecular weight of the acrylic component in the component C-2 is preferably 500 to 50,000, more preferably 1,000 to 30,000. The number average molecular weight of the whole component C-2 is preferably 1,000 to 100,000, more preferably 2,000 to 60,000.

The content of the component C-2 in the composition is preferably 1 to 16 parts by mass, more preferably 4 to 16 parts by mass, much more preferably 8 to 16 parts by mass based on 100 parts by mass of the conducting polymer (component A). When the content of the component C-2 is higher than 16 parts by mass, the conductivity of the coating film lowers. The expression "based on 100 parts by mass of the conducting polymer" means based on 100 parts by mass of the solid content of the conducting polymer as described above.

(Other Components)

The composition may contain diethylene glycol, triethylene glycol, tetraethylene glycol and polyethylene glycol to improve its conductivity. It may also contain a water-soluble compound which has an amide bond in the molecule and is liquid at room temperature.

The content of the compound is preferably 10 to 1,000 parts by mass, more preferably 30 to 600 parts by mass based on 100 parts by mass of the conducting polymer (component A). When the content of the compound is lower than 10 parts by mass, the effect of improving conductivity cannot be obtained fully, whereby the surface resistivity value rarely drops. When the content is higher than 1,000 parts by mass, the haze value of the coating film increases and strength of the coating film reduces. As a result, such inconvenience readily occurs that transparency of the coating film reduces the coating film easily peels off or the coating film is easily transferred to the rear surface in contact therewith when the film is rolled.

The coating film preferably contains an organic polymer binder as an optional constituent component so as to obtain the strength of the obtained coating film and prevent the dropout of the conducting polymer (component A) from the coating film, besides the acryl modified polyester having a glycidyl group (component C-2). Examples of the organic polymer binder include polyester, polyacryl, polyurethane, polyvinyl acetate and polyvinyl butyral.

The coating film may contain an antioxidant, heat resistant stabilizer, weathering stabilizer, ultraviolet absorbent, organic lubricant, pigment, dye, organic or inorganic fine particles, filler, transparent conductive agent and nucleating agent in limits not prejudicial to the effect of the present invention.

(Coating Composition)

The coating film is formed by applying the coating composition. The coating composition comprises the conducting polymer (component A), the water-soluble compound (component B), the crosslinking agent (component C), other optional components and water. The coating composition can be produced by mixing together the above components under agitation. Particularly, the above components can be uniformly dispersed while an ultrasonic treatment is carried out.

A suitable solvent having compatibility with water as a dispersion medium may be added to the coating composition in limits acceptable in the drying step. Examples of the solvent include methanol, ethanol, 2-propanol, n-propanol, isobutanol, ethylene glycol, acetone, acetonitrile, tetrahydrofuran, dioxane and a mixture thereof.

The solvent can dissolve the organic polymer binder. It can also improve the wettability of the coating composition to the base film. It can also control the solid content of the coating composition.

The coating composition may contain a small amount of a surfactant to improve the wettability of the base film. Preferred examples of the surfactant include nonionic surfactants such as polyoxyethylene alkylphenyl ethers, polyoxyethylene alkyl ethers and sorbitan fatty acid esters, and fluorine-based surfactants such as fluoroalkyl carboxylates, perfluoroalkylbenzene sulfonates, quaternary ammonium perfluoroalkyl salts and perfluoroalkyl polyoxyethylene ethanols.

(Base Film)

A film made of a (meth)acrylic resin, polystyrene, polyvinyl acetate, polyolefin such as polyethylene or polypropylene, polyvinyl chloride, polyvinylidene chloride, polyimide, polyamide, polysulfone, polycarbonate, polyester, resin partially modified by a functional group such as amino group, epoxy group, hydroxyl group or carbonyl group, or triacetyl cellulose (TAC) is preferred as the base film.

Examples of the polyester include polyethylene terephthalate (PET) and polyethylene naphthalene dicarboxylate (PEN). The polyester may be obtained by copolymerizing 20 mol % or less, preferably 10 mol % or less of a third component based on the total of all the acid components.

Out of these base films, a PET film, a PEN film and a film made of a copolyester thereof are particularly preferred from the viewpoints of mechanical properties, transparency and production cost. The thickness of the base film is not particularly limited but preferably 500 μm or less. When the base film has a thickness of more than 500 μm, its stiffness becomes too high, whereby the handling ease of the obtained film tends to deteriorate when it is attached to a display.

When a polyester film is used as the base film, the application of an aqueous coating solution for forming an anchor coat layer which will be described later may be carried out in any stage. It is preferred to carry it out in the production process of the polyester film. It is particularly preferred to apply the aqueous coating solution to the polyester film before the completion of oriented crystallization.

The polyester film before the completion of oriented crystallization includes an unstretched film, a monoaxially oriented film obtained by orienting an unstretched film in either one of longitudinal and transverse directions, or a biaxially oriented film obtained by stretching and orienting an unstretched film in longitudinal and transverse directions at a low draw ratio (biaxially stretched film before it is re-stretched in the longitudinal direction or the transverse direction in the end to complete oriented crystallization).

Preferably, the aqueous coating solution for forming an anchor coat layer is applied to unstretched film or a monoaxially stretched film obtained by stretching an unstretched film in one direction and the film is stretched in the longitudinal direction and/or the transverse direction and heat set.

To apply the aqueous coating solution for forming an anchor coat layer to the base film, it is preferred that the surface of the film should be subjected to a physical treatment such as corona treatment, flame treatment or plasma treatment as a pre-treatment or that a surfactant which is chemically inactive to the composition should be used in combination with the composition as a pre-treatment for improving adhesion and coatability.

The surfactant promotes the wetting to the base film of the aqueous coating solution for forming an anchor coat layer and examples thereof include anionic and nonionic surfactants such as polyoxyethylene alkylphenyl ethers, polyoxyethylene-fatty acid esters, sorbitan aliphatic esters, glycerin fatty acid esters, fatty acid metal soap, alkyl sulfates, alkyl sulfonates and alkyl sulfosuccinates. The surfactant is preferably contained in the composition for forming an anchor coat layer in an amount of 0.1 to 10 wt %.

(Process of Producing a Conductive Film)

The conductive film of the present invention can be produced by applying the coating composition to the base film to form a coating layer.

The coating technique for forming the coating layer may be a technique known per se. Preferred examples of the coating technique include lip direct coating, comma coating, slit reverse coating, die coating, gravure roll coating, blade coating, spray coating, air knife coating, dip coating and bar coating.

The coating layer can be formed by applying the coating composition, drying the coating layer and curing it. Drying can be carried out by heating. Curing may be carried out by heating or the application of ultraviolet radiation or electron beam. As for heating conditions, the coating layer is heated at 80 to 160° C. for 10 to 120 seconds, particularly preferably at 100 to 150° C. for 20 to 60 seconds. The dose of the ultraviolet radiation is generally 10 to 2,000 mJ/cm$^2$, preferably 50 to 1,500 mJ/cm$^2$, more preferably 100 to 1,000 mJ/cm$^2$.

To apply the coating composition to the base film, a physical surface treatment such as corona discharge treatment or plasma discharge treatment may be carried out as a pre-treatment for improving adhesion and coatability.

The thickness of the coating layer is preferably 0.01 to 0.30 μm, more preferably 0.02 to 0.25 μm. When the coating layer is too thin, satisfactory conductivity may not be obtained and when the coating layer is too thick, total light transmittance may become insufficient or blocking may occur.

(Anchor Coat Layer)

In the present invention, the anchor coat layer may be optionally formed between the coating layer and the base film. The component for forming the anchor coat layer is not particularly limited if it has transparency, as exemplified by polyurethane resin, polyacrylate resin, polyester resin, polyvinyl pyrrolidone resin, polyvinyl alcohol and polyvinyl alcohol/polyethylene copolymer.

The anchor coat layer preferably contains a polyester resin (P) and an acrylic resin (Q) having an oxazoline group and a polyalkylene oxide chain from the viewpoint of adhesion.

The polyester resin (P) used herein is, for example, a polyester composed of a polybasic acid and a polyol shown below.

It is particularly preferably a polyester which is soluble or dispersible in water (may contain a small amount of an organic solvent).

Examples of the polybasic acid component of the polyester resin (P) include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimeric acid and 5-sodium sulfoisophthalic acid. A copolyester comprising two or more of these acid components is particularly preferred. An unsaturated polybasic acid component such as maleic acid or itaconic acid, or a hydroxycarboxylic acid component such as p-hydroxybenzoic acid may be contained if its amount is small. Examples of the polyol component include ethylene glycol, 1,4-butanediol, diethylene glycol, dipropylene glycol, 1,6-hexanediol, 1,4-cyclohexanedimethanol, xylylene glycol, dimethylolpropane, poly(ethylene oxide)glycol and poly(tetramethylene oxide) glycol.

The acrylic resin (Q) having an oxazoline group and a polyalkylene oxide chain is preferably an acrylic resin which is soluble or dispersible in water (may contain a small amount of an organic solvent). Examples of the acrylic resin (Q) having an oxazoline group and a polyalkylene oxy chain include acrylic resins having the following monomers as a comonomer.

Examples of the monomer having an oxazoline group include 2-vinyl-2-oxazoline, 2-vinyl-4-methyl-2-oxazoline, 2-vinyl-5-methyl-2-oxazoline, 2-isopropenyl-4-methyl-2-oxazoline and 2-isopropenyl-5-methyl-2-oxazoline. They may be used alone or in combination of two or more. Out of these, 2-isopropenyl-2-oxazoline is industrially easily acquired advantageously. The cohesive force of the anchor coat layer is improved and the adhesion of the anchor coat layer to the coating layer becomes stronger by using the acrylic resin having an oxazoline group. Further, scratch resistance against a metal roll in the film forming step and the coating layer processing step can be provided to the surface of the base film. The content of the monomer having an oxazoline group in the acrylic resin (Q) is 2 to 40 wt %, preferably 3 to 35 wt %, more preferably 5 to 30 wt %.

The monomer having a polyalkylene oxide chain is, for example, a monomer obtained by addition reacting the carboxyl group of acrylic acid or methacrylic acid with alkylene oxide. The polyalkylene oxide chain is selected from polyethylene oxide, polypropylene oxide and polybutylene oxide. The number of the recurring units of the polyalkylene oxide chain is preferably 3 to 100. When the acrylic resin (Q) having an alkylene oxide chain is used, compatibility between the polyester resin (P) and the acrylic resin (Q) in the anchor coat layer becomes higher than an acrylic resin having no polyacrylene oxide chain, thereby making it possible to improve the transparency of the anchor coat layer. When the number of the recurring units of the polyalkylene oxide chain is smaller than 3, compatibility between the polyester resin and the acrylic resin lowers, whereby the transparency of the anchor coat layer degrades and when the number of the recurring units is larger than 100, the moist heat resistance of the anchor coat layer degrades, thereby reducing adhesion to the transparent conductive coating layer at a high temperature and a high humidity. The content of the monomer having a polyalkylene oxide chain in the acrylic resin (Q) is 3 to 40 wt %, preferably 4 to 35 wt %, more preferably 5 to 30 wt %.

Examples of the another comonomer of the acrylic resin (Q) are the following monomers. That is, they are alkyl acrylates and alkymethacrylates (the alkyl group is selected from methyl group, ethyl group, n-propyl group, isopropyl group, n-butyl group, isobutyl group, t-butyl group, 2-ethylhexyl group and cyclohexyl group); hydroxyl group-containing monomers such as 2-hydroxyethyl acrylate, 2-hydroxyethyl methacrylate, 2-hydroxypropyl acrylate and 2-hydroxypropyl methacrylate; epoxy group-containing monomers such as glycidyl acrylate, glycidyl methacrylate and allyl glycidyl ether; monomers having a carboxyl group or a salt thereof such as acrylic acid, methacrylic acid, itaconic acid, maleic acid, fumaric acid, crotonic acid, styrenesulfonic acid and salts (sodium salts, potassium salts, ammonium salts and tertiary amine salts) thereof; monomers having an amide group such as acrylamide, methacrylamide, N-alkylacrylamide, N-alkylmethacrylamide, N,N-dialkylacrylamide, N,N-dialkylmethacrylamide (the alkyl group is selected from methyl group, ethyl group, n-propyl group, isopropyl group, n-butyl group, isobutyl group, t-butyl group, 2-ethylhexyl group and cyclohexyl group), acryloylmorpholine, N-methylolacrylamide, N-methylolmethacrylamide, N-phenylacrylamide and N-phenylmethacrylamide; acid anhydride monomers such as maleic anhydride and itaconic anhydride; vinyl isocyanate, allyl isocyanate, styrene, vinyl methyl ether, vinyl ethyl ether, vinyl trialkoxysilane, alkyl maleic acid monoesters, alkyl fumaric acid monoesters, alkyl itaconic acid monoesters, acrylonitrile, methacrylonitrile, vinylidene chloride, ethylene, propylene, vinyl chloride, vinyl acetate and butadiene. The present invention is not limited to these monomers.

The content of the polyester resin (P) for forming an anchor coat layer in the anchor coat layer is preferably 5 to 95 wt %, particularly preferably 50 to 90 wt %. The content of the acrylic resin (Q) having an oxazoline group and a polyalkylene oxide chain for forming an anchor coat layer in the anchor coat layer is preferably 5 to 90 wt %, particularly preferably 10 to 50 wt %. When the content of the polyester resin (P) is higher than 95 wt % or the acrylic resin (Q) having an oxazoline group and a polyalkylene oxide chain is lower than 5 wt %, the cohesive force of the anchor coat layer lowers, whereby adhesion to the transparent conductive coating layer may become unsatisfactory.

To form the anchor coat layer on the base film, the above components are preferably used in the form of an aqueous solution such as water solution, water dispersion or emulsified solution. To form the anchor coat layer, components other than the above components, such as an antistatic agent, colorant, surfactant and ultraviolet absorbent may be optionally added. Particularly when a lubricant is added, anti-block properties can be further improved.

The solid content of the aqueous solution used to form the anchor coat layer is generally 20 wt % or less, particularly preferably 1 to 10 wt %. When this solid content is lower than 1 wt %, the wettability of the aqueous solution to the base film may become unsatisfactory and when the solid content is higher than 20 wt %, the storage stability of the coating solution and the appearance of the anchor coat layer may become worse.

The thickness of the anchor coat layer is not particularly limited if the effect of improving adhesion is obtained fully and transparency is not impaired. The thickness of the anchor coat layer is preferably 0.001 to 0.10 μm, more preferably 0.005 to 0.090 μm, much more preferably 0.01 to 0.085 μm.

The coating technique for forming the anchor coat layer may be a technique known per se. Examples of the technique include lip direct coating, comma coating, slit reverse coating, die coating, gravure roll coating, blade coating, spray coating, air knife coating, dip coating and bar coating. They may be used alone or in combination of two or more. The anchor coat layer may be formed on only one side of the film or both sides of the film.

Although the conductive film of the present invention must have the above coating layer on at least one side of the base film as described above, an anchor coat layer or a hard coat layer may be optionally formed on the side opposite to the coating layer formed side of the base film.

(Physical Properties of Conductive Film)

The conductive film of the present invention has a surface resistance change rate after it is treated at a temperature of 60° C. and a humidity of 90% for 240 hours of 160% or less, preferably 150% or less. When this change rate is higher than 160%, environmental resistance becomes unsatisfactory, thereby making it difficult to use the conductive film stably for a long time. This change rate can be easily adjusted by suitably setting the amount of the water-soluble compound (component B) and the amount of the crosslinking agent (component C).

The conductive film of the present invention has a total light transmittance of preferably 60 or more, more preferably 65% or more, much more preferably 70% or more, particularly preferably 80% or more. The total light transmittance is measured in accordance with JIS K7150. When the total light transmittance falls within the above range, the conductive film of the present invention can be advantageously used as a transparent electrode for liquid crystal displays or transparent touch panels or as an electromagnetic shielding material. The total light transmittance can be adjusted by suitably setting the thickness of the base film and the thickness of the coating layer.

The surface resistance of the coating layer of the conductive film of the present invention is preferably 10 to $1 \times 10^4 \Omega/\square$, more preferably 10 to $5 \times 10^3 \Omega/\square$. It is preferred that the surface resistance should fall within this range from the viewpoints of the function of an electrode when it is used as a transparent electrode for liquid crystal displays or transparent touch panels and electromagnetic shielding characteristics when it is used as an electromagnetic shielding material.

(Embodiment 1)

Preferred embodiments of the conductive film of the present invention are described below.

One of the preferred embodiments is a conductive film which comprises a base film and a coating layer formed on at least one side of the base film by curing a composition comprising:
(i) a conducting polymer containing a polycationic polythiophene having a recurring unit represented by the formula (1) as the main constituent and a polyanion (component A);
(ii) 10 to 1,000 parts by mass of a water-soluble compound containing at least 3 photocurable functional groups and 10 to 30 oxyethylene groups ($-O-CH_2-CH_2-$) in the molecule based on 100 parts by mass of component A (component B-1); and
(iii) 10 to 1,000 parts by mass of an alkoxysilane compound having a glycidyl group based on 100 parts by mass of component A (component C-1), and
which has a surface resistance change rate after it is treated at a temperature of 60° C. and a humidity of 90% for 240 hours of 150% or less.

The components A, B-1 and C-1 have already been described above.

The photocurable functional groups of the component B-1 are each preferably a (meth)acrylate group. The component B-1 is preferably any one of the compounds represented by the above formulas (2) to (4). The content of the component B-1 is 10 to 1,000 parts by mass, preferably 20 to 500 parts by mass based on 100 parts by mass of the conducting polymer (component A).

The component C-1 is preferably a trialkoxysilane having a glycidoxy group. γ-glycidoxypropyltrimethoxysilane is particularly preferred. The content of the component C-1 is 10 to 1,000 parts by mass, preferably 20 to 300 parts by mass, more preferably 30 to 200 parts by mass based on 100 parts by mass of the conducting polymer (component A).

Preferably, the conductive film has a total light transmittance of 60% or more and a surface resistance of 10 to $1 \times 10^4 \Omega/\square$. Preferably, the conductive film has an anchor coat layer containing a polyester resin and an acrylic resin having an oxazoline group and a polyalkylene oxide chain between the base film and the coating layer. The base film is preferably a polyethylene terephthalate or polyethylene naphthalene dicarboxylate film.

(Embodiment 2)

The other preferred embodiment is a conductive film which comprises a base film and a coating layer formed on at least one side of the base film by curing a composition comprising:
(i) a conducting polymer containing a polycationic polythiophene having a recurring unit represented by the formula (1) as the main constituent and a polyanion (component A);
(ii) 25 to 55 parts by mass of a water-soluble polyester having a sulfonate group and a hydroxyl group or carboxyl group based on 100 parts by mass of component A (component B-2); and
(iii) 10 to 1,000 parts by mass of an alkoxysilane compound having a glycidyl group (component C-1) and 1 to 16 parts by mass of an acryl modified polyester having a glycidyl group based on 100 parts by mass of component A (component C-2), and
which has a surface resistance change rate after it is treated at a temperature of 60° C. and a humidity of 90% for 240 hours of 160% or less.

Preferably, the conductive film has a total light transmittance of 80% or more and a surface resistivity of 10 to $1 \times 10^5 \Omega/\square$. The base film is preferably a polyester film.

The components A, B-2, C-1 and C-2 have already been described above.

The component B-2 is a polyester composed of a dicarboxylic acid component and a diol component. The component B-2 contains a sulfonate group. The sulfonate group is, for example, an alkali metal sulfonate group represented by $-SO_2Na$ or $-SO_3K$. The content of the sulfonate group in the component B-2 is preferably 2 to 10 mol %, more preferably 5 to 8 mol % based on 100 mol % of the total of all the acid components of the component B-2. The component B-2 contains a hydroxyl group, carboxyl group or both of them. The total content of the hydroxyl group and the carboxyl group is preferably 0.1 to 40 mol %, more preferably 1 to 20 mol % based on 100 mol % of the total of all the acid components of the component B-2.

The content of the component B-2 in the composition is preferably 25 to 55 parts by mass, more preferably 30 to 55 parts by mass, much more preferably 35 to 55 parts by mass based on 100 parts by mass of the conducting polymer (component A).

The acryl modified polyester having a glycidyl group (component C-2) is self-crosslinkable and reacts with the hydroxyl group or carboxyl group of the water-soluble polyester (component B-2) as it contains a glycidyl group to fulfill the function of a crosslinking agent. The content of the glycidyl group is preferably 3 to 20 mol %, more preferably 5 to 15 mol % based on 100 mol % of the acryl component of the component C-2. When the composition contains both of the components C-1 and C-2, a conductive film having excellent moist heat resistance while maintaining conductivity is obtained.
(Touch Panel)

In a resistive touch panel having a pair of electrodes, each having a conductive layer, in such a manner that the conductive layers are opposed to each other with a spacer therebetween, the conductive film of the present invention is preferably used as at least one of the electrodes.

EXAMPLES

The following examples are provided to further illustrate the present invention. "Parts" in the examples means parts by mass. The evaluations in the examples were based on the following methods.
(1) Film Thickness As for the thickness of the anchor coat layer and the thickness of the coating layer, the reflectances of light having a wavelength of 300 to 800 nm from these layers were measured by using a reflectance spectral film thickness meter (FE-3000 of Otsuka Electronics Co., Ltd.), and the n-k Cauchy dispersion equation was cited as the typical approximation of wavelength dispersion of a refractive index to fit the actually measured spectral values in the equation so as to obtain the thicknesses of these layers.
(2) Surface Resistance This was measured with the Lorester MCP-T600 of Mitsubishi Chemical Co., Ltd. in accordance with JIS $K_{7194}$. Five arbitrarily selected locations were measured to obtain the average value of these measurement data.
(3) Surface Resistance Change Rate After samples whose surface resistance was measured were put into a thermo-hygrostat set at 60° C. and 90% and kept for 240 hours, their surface resistances were measured again so as to calculate their surface resistance change rates based on the following equation.

Surface resistance change rate (%)=(surface resistance after treatment/surface resistance before treatment)×100

As the surface resistance change rate represented by this equation becomes lower, the moist heat resistance becomes higher.
(4) Total Light Transmittance This was measured with the HCM-2B haze meter of Suga Test Instruments Co., Ltd. in accordance with JIS K7150.
(5) Strength of Coating Film (Coating Film Adhesion)

This was measured with a color fastness rubbing tester (color fastness type rubbing tester of Tester Sangyo Co., Ltd.). Stated more specifically, the peeling of the coating film was evaluated when a load of 700 g was applied to a 10 mm² gauze fully impregnated with water and the coating film was rubbed by moving the gauze back and forth 10 times at a speed of 2 seconds/round trip. The evaluation criteria are shown below.
○: coating film does not peel
Δ: coating film peels but remains
X: coating film peels off and does not remain Example 1

<Formation of Base Film and Anchor Coat Layer>

Molten polyethylene terephthalate ([η]=0.62 dl/g, Tg=78° C.) was extruded from a die and cooled on a cooling drum in accordance with a commonly used method to obtain an unstretched film which was then stretched to 3.4 times in the longitudinal direction, and a coating solution for forming an anchor coat layer, prepared by diluting a coating composition consisting of 60 parts of the following polyester, 30 parts of the following acryl, 5 parts of the following additive and 5 parts of the following wetting agent with ion exchange water to have a concentration of 8% was uniformly applied to both sides of the stretched film with a roll coater. After the application of the coating solution, the film was stretched to 3.6 times in the transverse direction at 125° C. and heat set at 220° C. to be shrunk 3% in the transverse direction so as to obtain a base film having anchor coat layers and a thickness of 188 μm. The thickness of the anchor coat layer was 0.04 μm.
<Components of Coating Solution for Forming Anchor Coat Layer>
Polyester:

The polyester is composed of 65 mol % of 2,6-naphthalenedicarboxylic acid, 30 mol % of isophthalic acid and 5 mol % of 5-sodium sulfoisophthalic acid as acid components and 90 mol % of ethylene glycol and 10 mol % of diethylene glycol as glycol components (Tg=80° C., number average molecular weight Mn=13,000).

The polyester was produced as follows in accordance with the method described in Example 1 of JP-A 6-116487. That is, 44 parts of dimethyl 2,6-naphthalenedicarboxylate, 4 parts of dimethyl isophthalate, 34 parts of ethylene glycol and 2 parts of diethylene glycol were fed to a reactor, 0.05 part of tetrabutoxytitanium was added, and the reactor was heated at 230° C. in a nitrogen atmosphere to carryout an ester interchange reaction while the formed methanol was distilled off. Then, the temperature of the reaction system was gradually raised up to 255° C. to carryout a polycondensation reaction while the inside pressure of the system was reduced to 1 mmHg to obtain a polyester.
Acryl:

This is composed of 30 mol % of methyl methacrylate, 30 mol % of 2-isopropenyl-2-oxazoline, 10 mol % of polyethylene oxide (n=10) methacrylate and 30 mol % of acrylamide (Tg=50° C.)

The acryl was produced as follows in accordance with the method described in Production Examples 1 to 3 of JP-A 63-37167. That is, 3 parts of sodium laurylsulfonate as a surfactant and 181 parts of ion exchange water were fed to a four-necked flask and heated up to 60° C. in a nitrogen gas stream, 0.5 part of ammonium persulfate and 0.2 part of sodium hydrogen nitrite as polymerization initiators were added, and further a mixture of 23.3 parts of methyl methacrylate, 22.6 parts of 2-isopropenyl-2-oxazoline, 40.7 parts of polyethylene oxide (n=10) methacrylate and 13.3 parts of acrylamide was added dropwise over 3 hours while the temperature of the solution was adjusted to 60 to 70° C. After the end of addition, the reaction was continued under agitation while the same temperature was maintained for 2 hours, and then the reaction solution was cooled to obtain an acryl water dispersion having a solid content of 35%.
Additive:

Silica filler (average particle diameter of 100 nm) (Snowtex ZL of Nissan Chemical Industries, Ltd.)
Wetting Agent:

Polyoxyethylene (n=7) lauryl ether (Naroacty N-70 of Sanyo Chemical Industries, Ltd.)
<Formation of Coating Layer>

A coating solution prepared by mixing together 97 parts of a water dispersion of a conducting polymer containing 0.5 wt % of poly(3,4-ethylenedioxythiophene) and 0.8 wt % of polystyrene sulfonic acid (number average molecular weight Mn=150,000) (Baytron P of Bayer AG), 3 parts of diethylene glycol, 0.5 part of γ-glycidoxytrimethoxysilane (C1), 0.38 part of A-GLY-20E (manufactured by Shin Nakamura Chemical Co., Ltd., having a structure represented by the formula (2), l+m+n=20) as the water-soluble compound (B1) and 0.015 part of Irgacure 184 (of Ciba Specialty Chemicals Co., Ltd.) as a photopolymerization initiator and stirring the resulting mixture for 1 hour was applied to the above base film having anchor coat layers with a Meyer bar, dried at 140° C. for 1 minute and then exposed to 300 mJ/cm$^2$ of UV to obtain a conductive film having a coating layer. The thickness of the coating layer was 0.08 μm. The characteristic properties of the obtained conductive film are shown in Table 1.

Example 2

The procedure of Example 1 was repeated except that 0.38 part of AT-20E (manufactured by Shin Nakamura Kagaku Co., Ltd., having a structure represented by the formula (3), l+m+n=20) was used as the water-soluble compound (B2). The results are shown in Table 1.

Example 3

The procedure of Example 1 was repeated except that 1.14 parts of A-GLY-20E (manufactured by Shin Nakamura Kagaku Co., Ltd., having a structure represented by the formula (2), l+m+n=20) was used as the water-soluble compound (B1). The results are shown in Table 1.

Example 4

The procedure of Example 1 was repeated except that 0.75 part of γ-glycidoxytrimethoxysilane (C1) was used. The results are shown in Table 1.

Example 5

The procedure of Example 1 was repeated except that 1.0 part of γ-glycidoxytrimethoxysilane (C1) was used. The results are shown in Table 1.

Preparation Example 1

97 parts of a water dispersion of a conducting polymer containing 0.5 mass % of poly(3,4-ethylenedioxythiophene) and 0.8 mass % of polystyrene sulfonic acid (number average molecular weight=150,000) (Baytron P of Bayer AG) was mixed with 3 parts of diethylene glycol and 0.5 part of γ-glycidoxypropyltrimethoxysilane (C1) and stirred for 1 hour to obtain a water dispersion. 1.8 parts of a water-soluble polyester (B3, Plus Coat RZ-570, trade name (solid content of 25 mass %) of Goo Chemical Co., Ltd.) was added to the obtained dispersion and stirred for 15 minutes to obtain a mixed solution. The content of the water-soluble polyester (B3) in the mixed solution was 36 parts by mass based on 100 parts by mass of the conducting polymer.

RZ-570 is a water-soluble polyester containing terephthalic acid (80 mol %), isophthalic acid (14 mol %) and 5-Na sulfoisophthalic acid (6 mol %) as dicarboxylic acid components and ethylene glycol (74 mol %), diethylene glycol (8 mol %) and hexamethylene glycol (18 mol %) as diol components. The weight average molecular weight of RZ-570 is 23,000.

Preparation Example 2

The procedure of Preparation Example 1 was repeated except that 2.4 parts of the water-soluble polyester ((B3, Plus Coat RZ-570, trade name (solid content of 25 mass %) of Goo Chemical Co., Ltd.) was added to obtain a mixed solution. The content of the water-soluble polyester (B3) in the mixed solution was 48 parts by mass based on 100 parts by mass of the conducting polymer.

Example 6

0.2 part of an acryl modified polyester having a glycidyl group (C2, Pesresin A-615GE, trade name (solid content of 25 mass %) of Takamatsu Yushi Co., Ltd.) was added to the mixed solution obtained in Preparation Example 1 and stirred for 15 minutes to obtain a coating solution.

The obtained coating solution was applied to the base film having an anchor coat layer obtained in Example 1 with a Meyer bar and dried at 140° C. for 1 minute to obtain a conductive film having a 100 nm-thick coating layer. The content of the acryl modified polyester (C2) having a glycidyl group in the coating layer was 4 parts by mass based on 100 parts by mass of the conducting polymer. The obtained conductive film was measured for various items. The results are shown in Table 1.

The Pesresin A-615GE is an acryl modified polyester having methyl methacrylate (225 mol %) and glycidyl methacrylate (17 mol %) based on 100 mol % of the dicarboxylic acid component of the polyester. The content of the glycidyl group is 7 mol % based on 100 mol % of the acryl component. The polyester comprises terephthalic acid (55 mol %), isophthalic acid (40 mol %) and 5-Na sulfoisophthalic acid (5 mol %) as dicarboxylic acid components and ethylene glycol (77 mol %) and diethylene glycol (23 mol %) as diol components. The number average molecular weight of the Pesresin A-615GE is 7,700, the number average molecular weight of the polyester component is 3,500, and the number average molecular weight of the acryl component is 4,200.

Example 7

The procedure of Example 6 was repeated except that 0.4 part of an acryl modified polyester having a glycidyl group (C2, Pesresin A-615GE, trade name (solid content of 25 mass %) of Takamatsu Yushi Co., Ltd.) was added to the mixed solution obtained in Preparation Example 1 and stirred for 15 minutes to obtain a conductive film having a coating layer. The content of the acryl modified polyester having a glycidyl group (C2) in the coating layer was 8 parts by mass based on 100 parts by mass of the conducting polymer. The measurement results of the characteristic properties of the obtained conductive film are shown in Table 1.

Example 8

The procedure of Example 6 was repeated except that 0.8 part of an acryl modified polyester having a glycidyl group (C2, Pesresin A-615GE, trade name (solid content of 25 mass %) of Takamatsu Yushi Co., Ltd.) was added to the mixed solution obtained in Preparation Example 1 and stirred for 15 minutes to obtain a conductive film having a coating layer. The content of the acryl modified polyester having a glycidyl group (C2) in the coating layer was 16 parts by mass based on 100 parts by mass of the conducting polymer. The measurement results of the characteristic properties of the obtained conductive film are shown in Table 1.

Example 9

The procedure of Example 6 was repeated except that the mixed solution obtained in Preparation Example 2 was used to obtain a conductive film. The measurement results of the characteristic properties of the obtained conductive film are shown in Table 1.

Comparative Example 1

Only the mixed solution obtained in Preparation Example 1 was applied and a conductive film was obtained by the procedure of Example 1. The measurement results of the characteristic properties of the obtained conductive film are shown in Table 1.

els, liquid crystal displays (LCD), organic electroluminescent devices (OLED) or inorganic electroluminescence devise and as an electromagnetic shielding material.

The invention claimed is:

1. A conductive film which has a base film and a coating layer formed on at least one side of the base film by curing a composition comprising:

(i) a conducting polymer containing a cationic polythiophene having a recurring unit represented by the following formula (1) as the main constituent and a polyanion (component A):

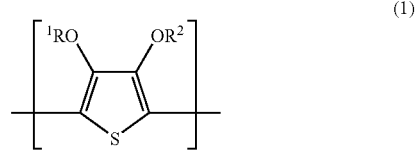

(1)

wherein $R^1$ and $R^2$ are each independently a hydrogen atom or alkyl group having 1 to 4 carbon atoms or bonded together to form an alkylene group having 1 to 12 carbon atoms which may be substituted arbitrarily;

TABLE 1

| | Constitution of coating film | | | | | | Characteristic properties of conductive film | | | | |
|---|---|---|---|---|---|---|---|---|---|---|---|
| | Conducting polymer | Water-soluble compound (B) | | | Crosslinking agent (C) | | | Surface resistance value (Ω/□) | | | |
| | (A) Parts by mass | type | main hydrophilic group | l + m + n + o | type | Parts by mass | Total light transmittance (%) | Before moist heat test | After moist heat test | Surface resistance change rate (%) | Strength of coating film |
| Ex. 1 | 100 | B1 | Polyoxyethylene group | 20 | C1 | 30 | 40 | 85 | 830 | 1013 | 122 | ○ |
| Ex. 2 | 100 | B2 | Polyoxyethylene group | 20 | C1 | 30 | 40 | 84 | 850 | 1173 | 138 | ○ |
| Ex. 3 | 100 | B1 | Polyoxyethylene group | 20 | C1 | 90 | 40 | 80 | 880 | 1162 | 132 | ○ |
| Ex. 4 | 100 | B1 | Polyoxyethylene group | 20 | C1 | 30 | 60 | 84 | 1100 | 1650 | 150 | ○ |
| Ex. 5 | 100 | B1 | Polyoxyethylene group | 20 | C1 | 30 | 80 | 83 | 1318 | 2110 | 160 | Δ |
| Ex. 6 | 100 | B3 | Sulfonate group | — | C1/C2 | 36 | 40/4 | 87 | 586 | 892 | 152 | ○ |
| Ex. 7 | 100 | B3 | Sulfonate group | — | C1/C2 | 36 | 40/8 | 87 | 613 | 917 | 150 | ○ |
| Ex. 8 | 100 | B3 | Sulfonate group | — | C1/C2 | 36 | 40/16 | 87 | 650 | 886 | 136 | ○ |
| Ex. 9 | 100 | B3 | Sulfonate group | — | C1/C2 | 48 | 40/4 | 82 | 690 | 1035 | 150 | ○ |
| C. Ex. 1 | 100 | — | — | — | — | — | — | 87 | 587 | 1235 | 210 | X |

Ex: Example
C. Ex: Comparative Example
B1: compound represented by the formula (2)
B2: compound represented by the formula (3)
B3: water-soluble polyester (Plus Coat RZ-570)
C1: γ-glycidoxytrimethoxysilane
C2: acryl modified polyester having a glycidyl group (Pesresin A-615GE)
l + m + n + o: total number of oxyethylene recurring units Effect of the Invention The conductive film of the present invention has excellent moist heat resistance. The conductive film of the present invention is also excellent in conductivity, transparency and coating film strength. Since the conductive film of the present invention has excellent moist heat resistance while retaining transparency and conductivity, when it is used as an electrode for displays or touch panels, it can be used stably for a long time.

INDUSTRIAL APPLICABILITY

Since the conductive film of the present invention has high moist heat resistance while retaining excellent conductivity, it is extremely useful as a transparent electrode for touch pan- (ii) 25 to 55 parts by mass of a water-soluble polyester having a sulfonate group and a hydroxyl group or carboxyl group based on 100 parts by mass of component A (component B-2); and (iii) 10 to 1,000 parts by mass of an alkoxysilane compound having a glycidyl group (component C-1) and 1 to 16 parts by mass of an acryl modified polyester having a glycidyl group based on 100 parts by mass of component A (component C-2), wherein the content of the glycidyl group is 3 to 20 mol% based on 100 mol% of the acryl component of the component C-2, and which has a surface resistance change rate after it is treated at a temperature of 60° C. and a humidity of 90% for 240 hours of 152% or less.

2. The conductive film according to claim 1 which has a total light transmittance of 80% or more and a surface resistance of 10 to $1 \times 10^5$ Ω/□.

3. The conductive film according to claim 1, wherein the base film is a polyester film.

4. A resistive touch panel comprising a pair of electrodes, each having a conductive layer, in such a manner that the conductive layers are opposed to each other with a spacer therebetween, wherein the conductive film of claim 1 is used as at least one of the electrodes.

5. A resistive touch panel comprising a pair of electrodes, each having a conductive layer, in such a manner that the conductive layers are opposed to each other with a spacer therebetween, wherein the conductive film of claim 2 is used as at least one of the electrodes.

6. A resistive touch panel comprising a pair of electrodes, each having a conductive layer, in such a manner that the conductive layers are opposed to each other with a spacer therebetween, wherein the conductive film of claim 3 is used as at least one of the electrodes.

* * * * *